US008174855B2

(12) United States Patent
Ribarich et al.

(10) Patent No.: US 8,174,855 B2
(45) Date of Patent: May 8, 2012

(54) POWER FACTOR CORRECTION INTEGRATED CIRCUIT WITH CRITICAL CONDUCTION MODE

(75) Inventors: Thomas J. Ribarich, Laguna Beach, CA (US); Masashi Sekine, Harbor City, CA (US); Dana Wilhelm, Temple City, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/548,928

(22) Filed: Oct. 12, 2006

(65) Prior Publication Data
US 2007/0085517 A1  Apr. 19, 2007

Related U.S. Application Data

(60) Provisional application No. 60/726,044, filed on Oct. 12, 2005.

(51) Int. Cl.
*H02M 7/217* (2006.01)
(52) U.S. Cl. ........................................................ 363/89
(58) Field of Classification Search .................. 323/207, 323/222; 363/89, 147
See application file for complete search history.

(56) References Cited

U.S. PATENT DOCUMENTS

| | | | | |
|---|---|---|---|---|
| 5,818,707 A * | 10/1998 | Seong et al. | | 363/89 |
| 5,896,263 A * | 4/1999 | Terdan et al. | | 361/101 |
| 6,259,614 B1 * | 7/2001 | Ribarich et al. | | 363/89 |
| 6,411,533 B2 * | 6/2002 | Hooijer et al. | | 363/89 |
| 6,430,070 B1 * | 8/2002 | Shi et al. | | 363/97 |
| 6,862,201 B2 * | 3/2005 | Hodge, Jr. | | 363/89 |
| 6,882,551 B2 * | 4/2005 | Shimada et al. | | 363/79 |
| 7,088,079 B2 * | 8/2006 | Lefedjiev | | 323/222 |
| 7,397,678 B2 * | 7/2008 | Frank et al. | | 363/89 |
| 2005/0207193 A1 * | 9/2005 | Adragna | | 363/89 |
| 2006/0028257 A1 * | 2/2006 | Huang et al. | | 327/175 |
| 2007/0085517 A1 * | 4/2007 | Ribarich et al. | | 323/235 |

* cited by examiner

*Primary Examiner* — Jeffrey Sterrett
(74) *Attorney, Agent, or Firm* — Farjami & Farjami LLP (57) ABSTRACT

A power factor correction integrated circuit housed in an integrated circuit package for controlling a boost converter circuit having an input inductor coupled in series with a boost rectifier between a rectified AC line input voltage and a DC bus voltage, on a DC bus, the rectified AC line input voltage provided by a rectifier coupled to an AC line input voltage to be power factor corrected. The integrated circuit including a first input circuit sensing the DC bus voltage; a second input circuit sensing current through the inductor and determining when the current through the inductor discharges to substantially zero current, a power switch coupled between a common connection of the inductor and boost rectifier and a return line of the DC bus for allowing the inductor to be charged by current from the rectified AC line input voltage when the power switch is turned on; and a control circuit having inputs coupled to outputs from the first and second input circuits to control the On-Time of the power switch to regulate the DC bus voltage to a desired voltage level and to achieve power factor correction of the AC line input voltage.

21 Claims, 7 Drawing Sheets

POWER FACTOR CORRECTION INTEGRATED CIRCUIT WITH CRITICAL CONDUCTION MODE

CROSS-REFERENCE TO RELATED APPLICATION

This application is based on and claims the benefit of U.S. Provisional Application Ser. No. 60/726,044, filed on Oct. 12, 2005, entitled POWER FACTOR CORRECTION IC, to which a claim of priority is hereby made and the disclosure of which is incorporated by reference.

BACKGROUND OF THE INVENTION

The present invention relates to an active power factor controller and more particularly to a fully-integrated, fully-protected active power factor controller that operates in a critical-conduction mode and provides for high PF, low Total Harmonic Distortion (THD) and stable DC Bus regulation and includes an over-current protection together with the RDS(on) of the PFC MOSFET assembled with a MOSFET in single package.

In most electronic devices it is necessary to have the circuit act as a pure resistive load to the AC input line voltage. The degree to which the circuit matches a pure resistor is measured by the phase shift between the input voltage and input current and how well the shape of the input current waveform matches the shape of the sinusoidal input voltage. The cosine of the phase angle between the input voltage and input current is defined as the power factor (PF), and how well the shape of the input current waveform matches the shape of the input voltage is determined by the THD. A power factor of 1.0 (maximum) corresponds to zero phase shift and a THD of 0% represents a pure sine wave (no distortion). For this reason it is desirable to have a high PF and a low THD.

SUMMARY OF THE INVENTION

It is an object of the present invention to provide a critical conduction mode boost type Power Factor Correction (PFC) circuit, in which a PFC current sense resistor is not required, the circuit should include a DC Bus over-voltage protection, internal RDS(on) over-current protection, thermal overload protection; latch immunity and ESD protection; and should have a micropower startup of about 250 µA.

A power factor correction integrated circuit housed in an integrated circuit package for controlling a boost converter circuit having an input inductor coupled in series with a boost rectifier between a rectified AC line input voltage and a DC bus voltage, on a DC bus, the rectified AC line input voltage provided by a rectifier coupled to an AC line input voltage to be power factor corrected. The integrated circuit including a first input circuit sensing the DC bus voltage; a second input circuit sensing current through the inductor and determining when the current through the inductor discharges to substantially zero current, a power switch coupled between a common connection of the inductor and boost rectifier and a return line of the DC bus for allowing the inductor to be charged by current from the rectified AC line input voltage when the power switch is turned on; and a control circuit having inputs coupled to outputs from the first and second input circuits to control the On-Time of the power switch to regulate the DC bus voltage to a desired voltage level and to achieve power factor correction of the AC line input voltage. The control circuit including a feedback circuit comparing the DC bus voltage to a reference voltage and for turning of the power switch for a period of time to maintain the DC bus voltage at the desired level. The control circuit further operating so that when the inductor current is substantially zero, the power switch is turned ON for forced current to open through the inductor and charge the inductor, thereby forcing the current in the inductor to follow the rectified AC line input voltage and achieve power factor correction of the AC line input voltage. The power switch being contained within the integrated circuit package.

Other features and advantages of the present invention will become apparent from the following description of the invention that refers to the accompanying drawings.

DETAILED DESCRIPTION OF EMBODIMENTS OF THE INVENTION

Figure 1:
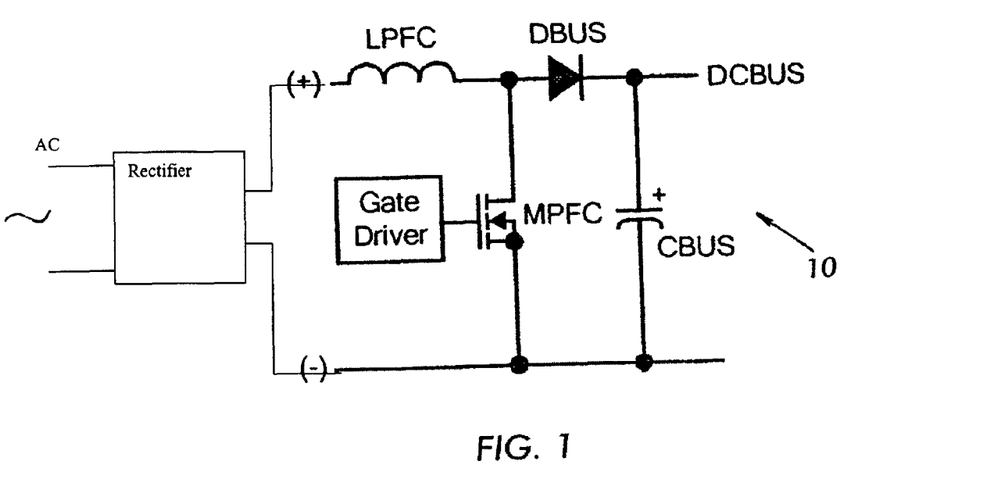
FIG. 1 is a circuit diagram of a boost-type Power Factor Correction (PFC) circuit.

The present invention is an active Power Factor Correction (PFC) circuit, which produces an AC line input current for an AC line input voltage. FIG. 1 illustrates a circuit 10 of a boost-type converter. The illustrated circuit includes a gate driver connected to a PFC MOSFET switch $M_{PFC}$ having a source coupled to a negative side of the AC source and a drain coupled to an inductor $L_{PFC}$ and an anode of a diode $D_{BUS}$ on a positive side of the AC source, a capacitor $C_{BUS}$ being connected to the cathode of the diode $D_{BUS}$ and the DC bus.

The present invention proposes a control method implemented for a boost-type converter of FIG. 1 running in critical-conduction mode (CCM). During each switching cycle of the switch $M_{PFC}$, the circuit waits until the inductor $L_{PFC}$ current discharges to zero before turning the switch $M_{PFC}$ on again. The switch $M_{PFC}$ is turned on and off at a much higher frequency (>10 KHz) than the line input frequency (50 to 60 Hz).

When the switch $M_{PFC}$ is turned on, the inductor $L_{PFC}$ is connected between the rectified line input (+) and (−) causing the current in the inductor $L_{PFC}$ to charge up linearly. When the switch $M_{PFC}$ is turned off, the inductor $L_{PFC}$ is connected between the rectified line input (+) and the DC bus capacitor $C_{BUS}$ (through the diode $D_{BUS}$) and the stored current in the inductor $L_{PFC}$ flows into the capacitor $C_{BUS}$. As the switch $M_{PFC}$ is turned on and off at a high frequency, the voltage on the capacitor $C_{BUS}$ charges up to a specified voltage.

A feedback loop of the present invention, which will be discussed below with reference to FIG. 4, regulates this voltage to a fixed value by continuously monitoring a DC voltage and adjusting the On-Time of the switch $M_{PFC}$ accordingly. For an increasing DC voltage on the DC bus the On-Time is decreased, and for a decreasing DC voltage on the DC bus the On-Time is increased. This negative feedback control is performed with a slow loop speed and a low loop gain such that the average inductor current smoothly follows the low-frequency line input voltage for high power factor and low Total Harmonic Distortion (THD). The On-Time of the switch $M_{PFC}$ therefore appears to be fixed over several cycles of the line voltage. The apparent fixation of the On-Time is achieved with an additional modulation that will be discussed below.

Figure 2:
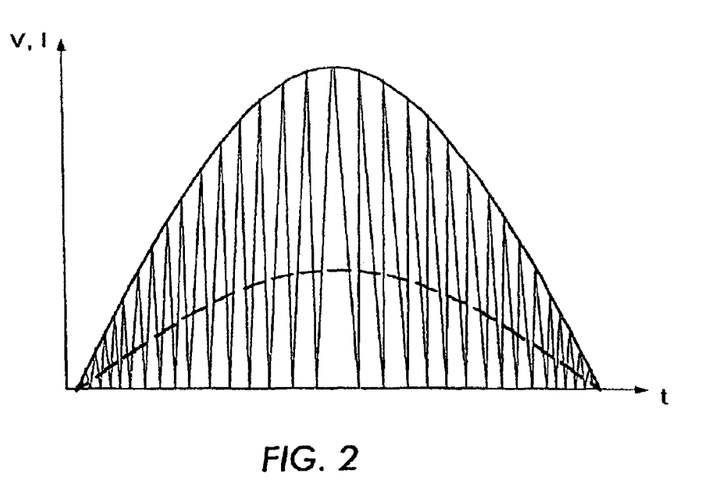
FIG. 2 is a graph showing switching frequency of the PFC control circuit of the present invention that is free-running and constantly changing from a high frequency near the zero crossing of the AC input line voltage to a lower frequency at the peaks.

With a fixed On-Time and an Off-Time determined by the inductor current discharging to zero, the result is a system where the switching frequency is free-running and constantly changing from a high frequency near the zero crossing of the AC input line voltage to a lower frequency at the peaks. This is illustrated in FIG. 2, where input voltage is shown by a solid sinusoidal line, PFC inductor current is shown by a triangular lines, and an input current is shown with a dashed smoothed sinusoidal line over one half-cycle of the line input voltage.

When the line input voltage is low, i.e., near the zero crossing, the inductor current will charge up to a small amount and the discharge time will be fast resulting in a high switching frequency. When the input line voltage is high, i.e., near the peak, the inductor current will charge up to a higher amount and the discharge time will be longer giving a lower switching frequency. The triangular PFC inductor current is then smoothed by an Electro-Magnetic Interference (EMI) filter to produce sinusoidal line input current.

Figure 3A:
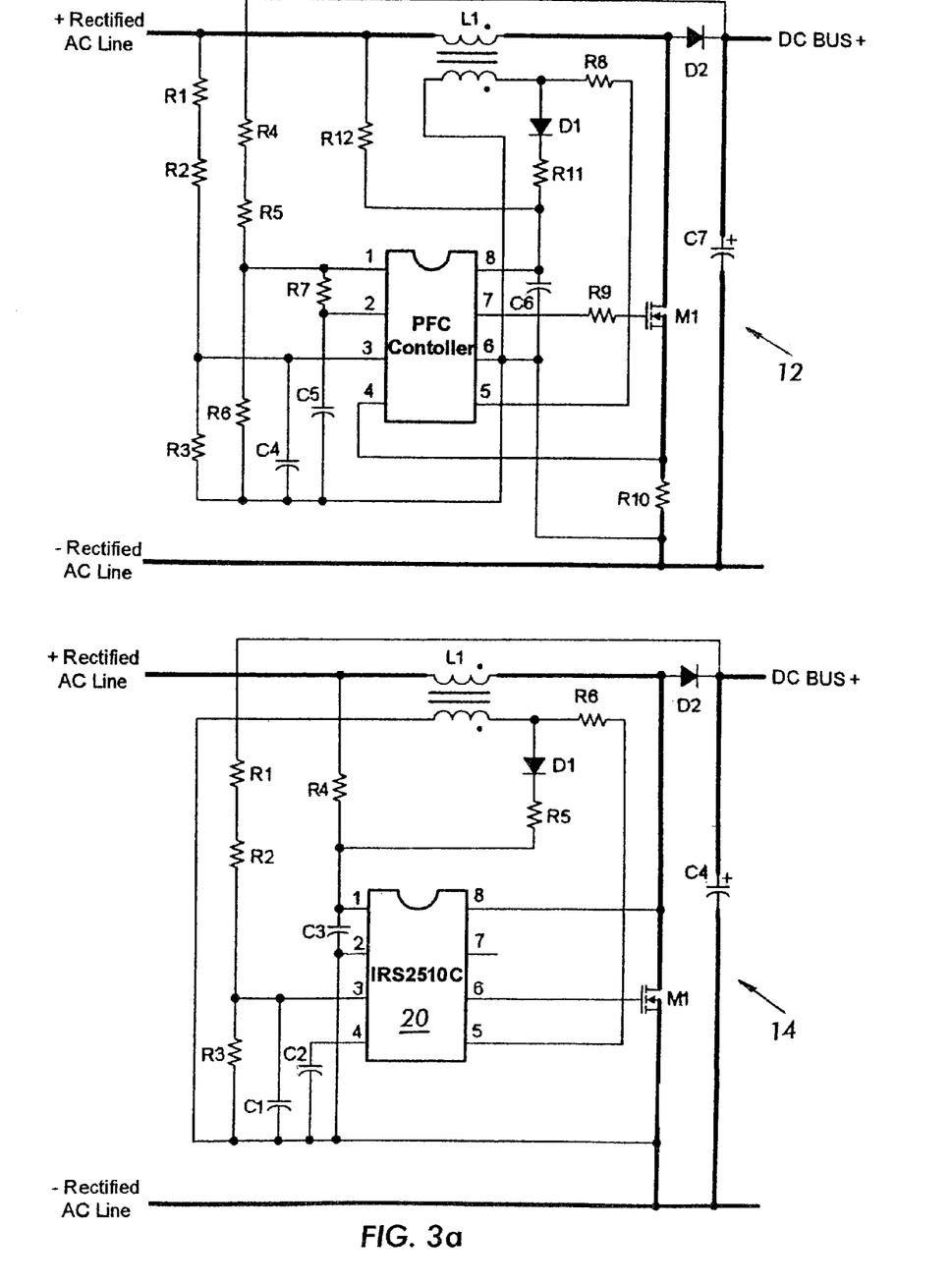
FIG. 3a is a diagram of a PFC circuit integrated with a typical boost-type PFC and the PFC circuit of the present invention integrated with the inventive boost-type PFC.

FIG. 3 illustrates a PFC circuit 12 including a typical PFC controller and a PFC circuit of the present invention including a PFC controller 20. As illustrated the circuit 12 requires 12 resistors R1-R12, four capacitors C4-C7, two diodes D1-D2, an inductor L1, and a switch M1. The circuit 14 of the present invention cuts the number of resistors in half to only six R1-R6, thereby decreasing power consumption and a foot print of the circuit 14.

As in circuit 10 of FIG. 1, circuit 14 includes the inductor L1. A first terminal of a primary winding of the inductor L1 is coupled to VCC pad 1 through the resistor R4 and to the (−) side of the rectified AC input line. VCC pad 1 being coupled to COM pad 2 through the capacitor C3. A second terminal of the primary winding of the inductor L1 is coupled to a drain of the switch $M_{PFC}$; DRAIN pad 8; and to an anode of the diode D2, a cathode of the diode D2 is coupled to the (−) side of the AC source line through the capacitor C4.

A first terminal of a secondary winding of the inductor L1 is coupled to VBUS pad 3 through the parallel coupled resistor R3 and capacitor C1; to the cathode of the diode D2 through the in series resistors R1-R3; and to COMP pad 4 through the capacitor C2. A second terminal of a secondary winding of the inductor L1 is coupled to ZX pad 5 through a resistor R6; to VCC pad 1 through the in series coupled diode D1 and resistor R5. As stated above, VCC pad 1 is coupled to COM pad 2 through the capacitor C3.

Figure 3B:
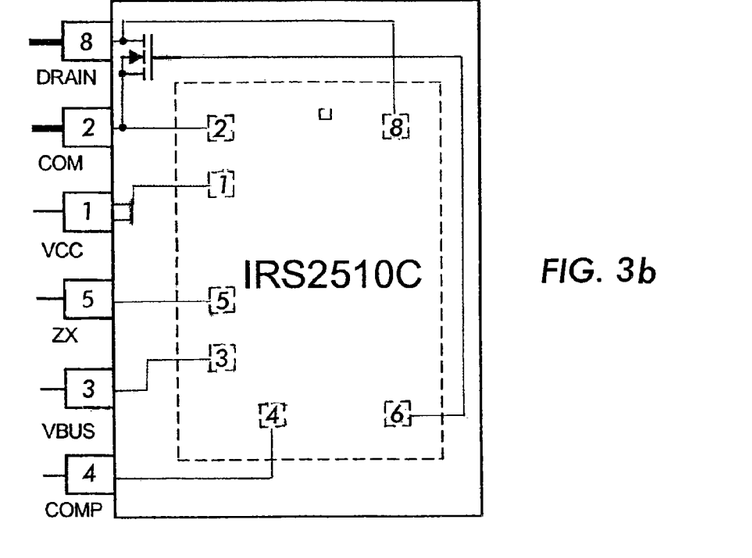
FIG. 3b is a diagram of a PFC circuit of the present invention integrated in a single six pin package with a MOSFET power switch.

As illustrated in FIG. 3b, the circuit 20 may be provided inside a six pin package that includes the PFC MOSFET switch $M_{PFC}$ whose gate is coupled to PFC pad 6, a source is coupled to the (−) side of the rectified AC source line input, which can be done via COM pad 2, and its drain is coupled to the second terminal of the primary winding of the inductor L1, which can be done via DRAIN pad 8.

Figure 4:
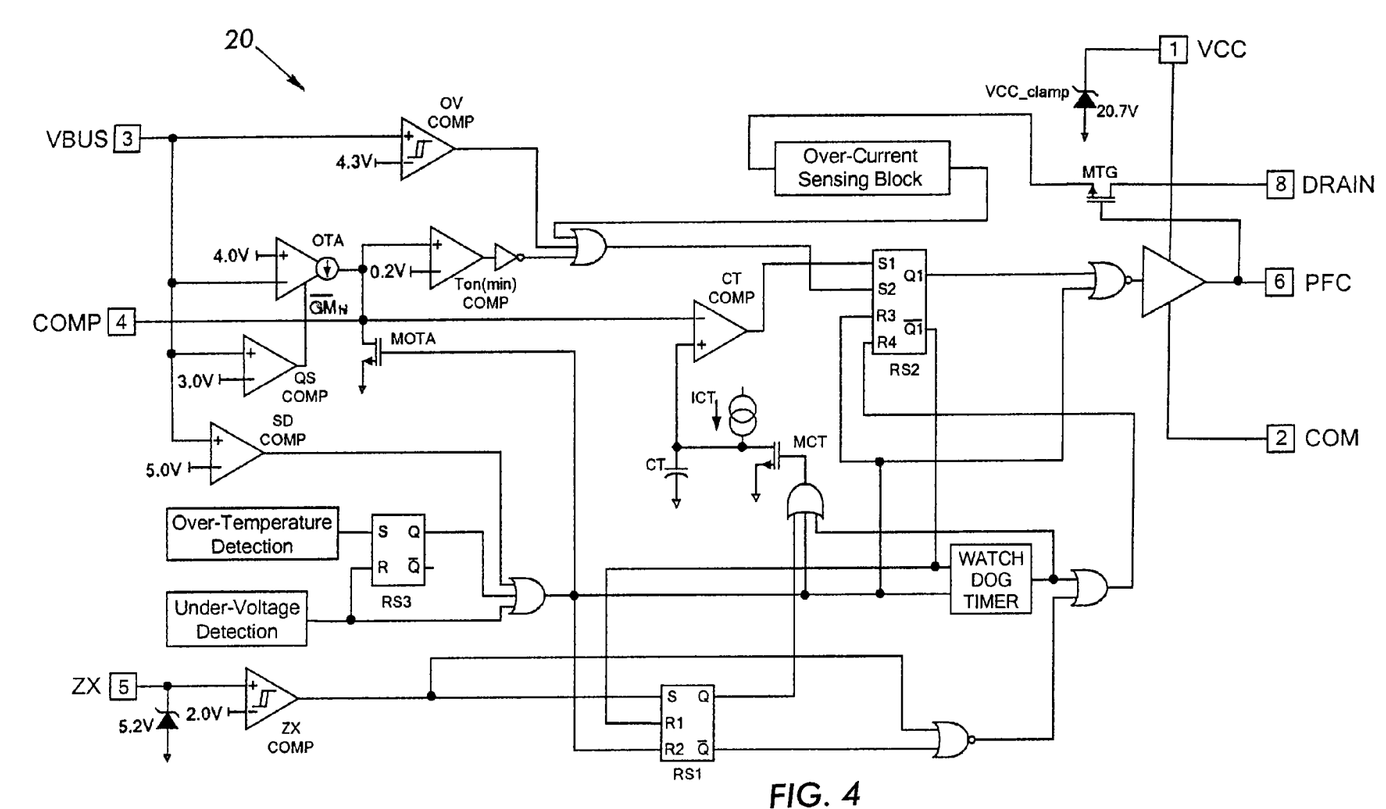
FIG. 4 is a detailed circuit diagram of a boost-type PFC control circuit of the present invention.

FIG. 4 shows the PFC control circuit 20 of the present invention. Compared to the typical PFC controller as in circuit 12 (FIG. 3), the PFC control circuit 20 requires only four control pads or pins. The required pads include a DC bus voltage sensing input VBUS pad 3, i.e., via an external resistor voltage divider. VBUS pad 3 is regulated against a fixed internal 4V reference voltage for regulating the DC bus voltage. The control circuit 20 further requires PFC Error Amplifier compensation COMP pad 4 for programming the On-Time of the switch $M_{PFC}$ and the speed of the feedback loop; PFC zero crossing detection input ZX pad 5 for detecting when the current is flowing in the inductor $L_{PFC}$ discharges to zero, i.e., via a secondary winding from the PFC inductor $L_{PFC}$, PFC is the output of the gate drive of the switch $M_{PFC}$; and current sensing input DRAIN pad 8 to monitor the current flowing through the switch $M_{PFC}$.

As shown in FIG. 4, the control circuit 20 also provides non-control pads including a common COM pad 2; a control circuit voltage supply $V_{CC}$ pad 1; and a gate driver output PFC pad 6.

The feedback loop is performed by an operational transconductance amplifier OTA that sinks or sources a current to the external capacitor C2 (FIG. 3) at COMP pad 4. The resulting voltage on COMP pad 4 sets the threshold for the charging of an internal timing capacitor CT and therefore programs the time of the "HIGH" state at PFC pad 6. At the startup, the gain of the OTA is set to a high level until the VBUS pad 3 reaches 3.0V to raise the DC bus level quickly. The gain is then decreased to a lower level necessary for achieving high Power Factor and low THD.

Figure 5:
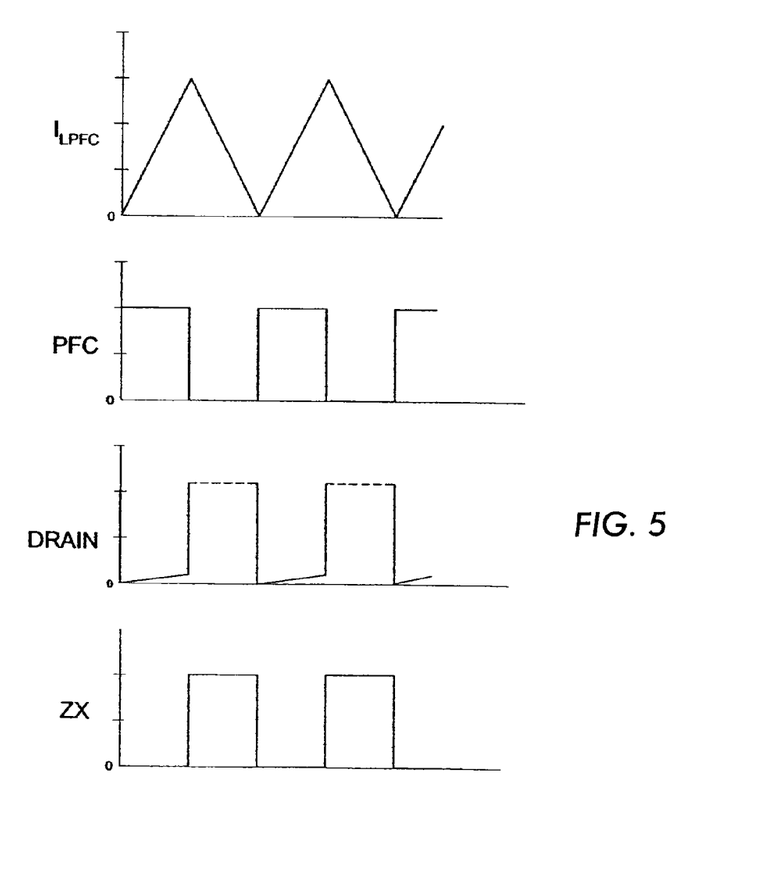
FIG. 5 is a graph showing a timing diagram of the inductor $L_{PFC}$ current through PFC, DRAIN and ZX pads.

The time of "LOW" state at PFC pad 6 is determined by the time that it takes the inductor $L_{PFC}$ (FIG. 1) current to discharge to zero. This zero current level is detected by a secondary winding on the inductor $L_{PFC}$ that is connected to ZX pad 5 via a resistor R6 of circuit 14 (FIG. 3). As illustrated in FIG. 5, a positive-going edge, of the current through the inductor, exceeding the internal 2V threshold signals the beginning of the Off-Time. A negative-going edge falling below 1.7V will occur when the inductor $L_{PFC}$ current discharges to zero, which signals the end of the Off-Time and PFC goes high again. The cycle repeats itself indefinitely until the PFC section is disabled due to an over-voltage on the output, an over-current on the switch $M_{PFC}$, or a negative transition of voltage at ZX pad 5 does not occur. Should the negative edge on ZX pad 5 not occur, the voltage of PFC pad 6 will remain low until a watch-dog timer forces PFC pad 6 "HIGH" for an On-Time duration programmed by the voltage on COMP pad 4. The watchdog pulses occur approximately every 400 us indefinitely until a correct positive- and negative-going signal is detected on the ZX pad 5 and normal PFC operation is resumed.

Drain Voltage Sensing/Over-Current Protection

Figure 6:
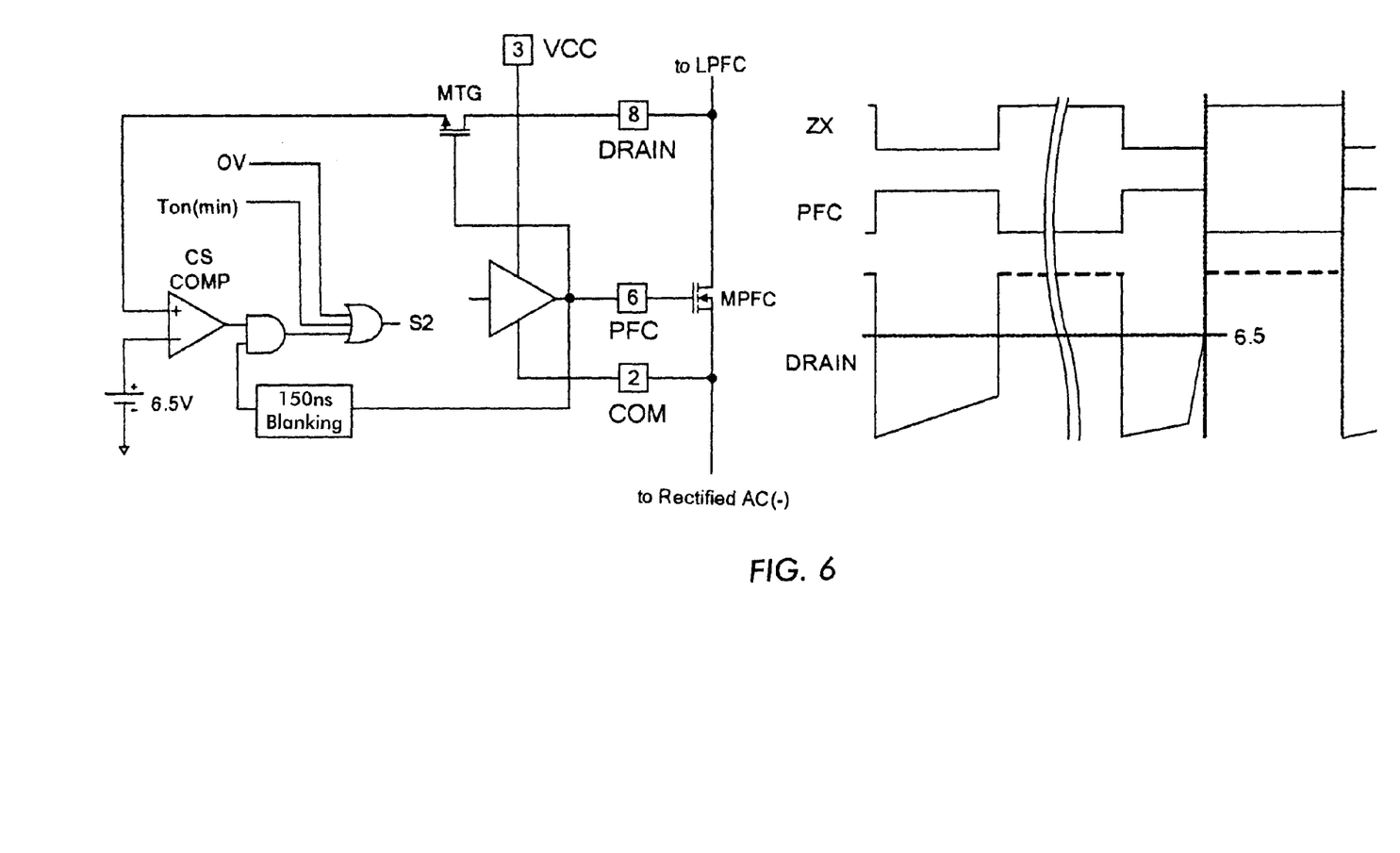
FIG. 6 is a block diagram of an over-current sensing circuit of the circuit of the present invention and a graph showing a timing diagram of the switch $M_{PFC}$ current through PFC, DRAIN and ZX pads.

FIG. 6 illustrates an over-current sensing block provided in the control circuit 20. To detect an over-current condition without the need of an external current sense resistor, the over-current sensing block uses the on-resistance (RDSon) of the external switch $M_{PFC}$. The voltage at a drain of the switch $M_{PFC}$, provided at DRAIN pad 8, is determined by the current flowing through it and its on-resistance (RDSon). DRAIN pad 8 is used to measure this DRAIN voltage during the ON-time of the driven switch $M_{PFC}$.

An internal high voltage MOSFET switch MTG is connected as a transmission gate and effectively applies the voltage level sensed at DRAIN pad 8 to one input of a comparator CS COMP. The internal high voltage switch $M_{TG}$ is needed as the voltage at DRAIN pad 8 may be at a level of 600V when the external PFC switch $M_{PFC}$ is OFF. This magnitude of voltage can not be safely applied directly to the input of the sensing comparator CS COMP.

As illustrated in the graph of FIG. 6, when the PFC output at PFC pad 6 goes "HIGH", the internal high-voltage switch $M_{TG}$ is turned ON. The voltage at DRAIN pad 8 is compared to a fixed threshold. Should the voltage at DRAIN pad 8 during the switch $M_{PFC}$ ON-time reach a value greater than this fixed threshold, e.g., 6.5V, an over-current condition is signaled and the PFC output is set to LOW.

The over-current sensing block works on a cycle by cycle basis and provides a blanking circuit, used to filter any potential leading edge current spikes that can occur during the initial turn ON of the switch $M_{PFC}$. This blanking circuit very effectively limits the maximum current through the switch $M_{PFC}$.

On-Time Modulation

Figure 7:
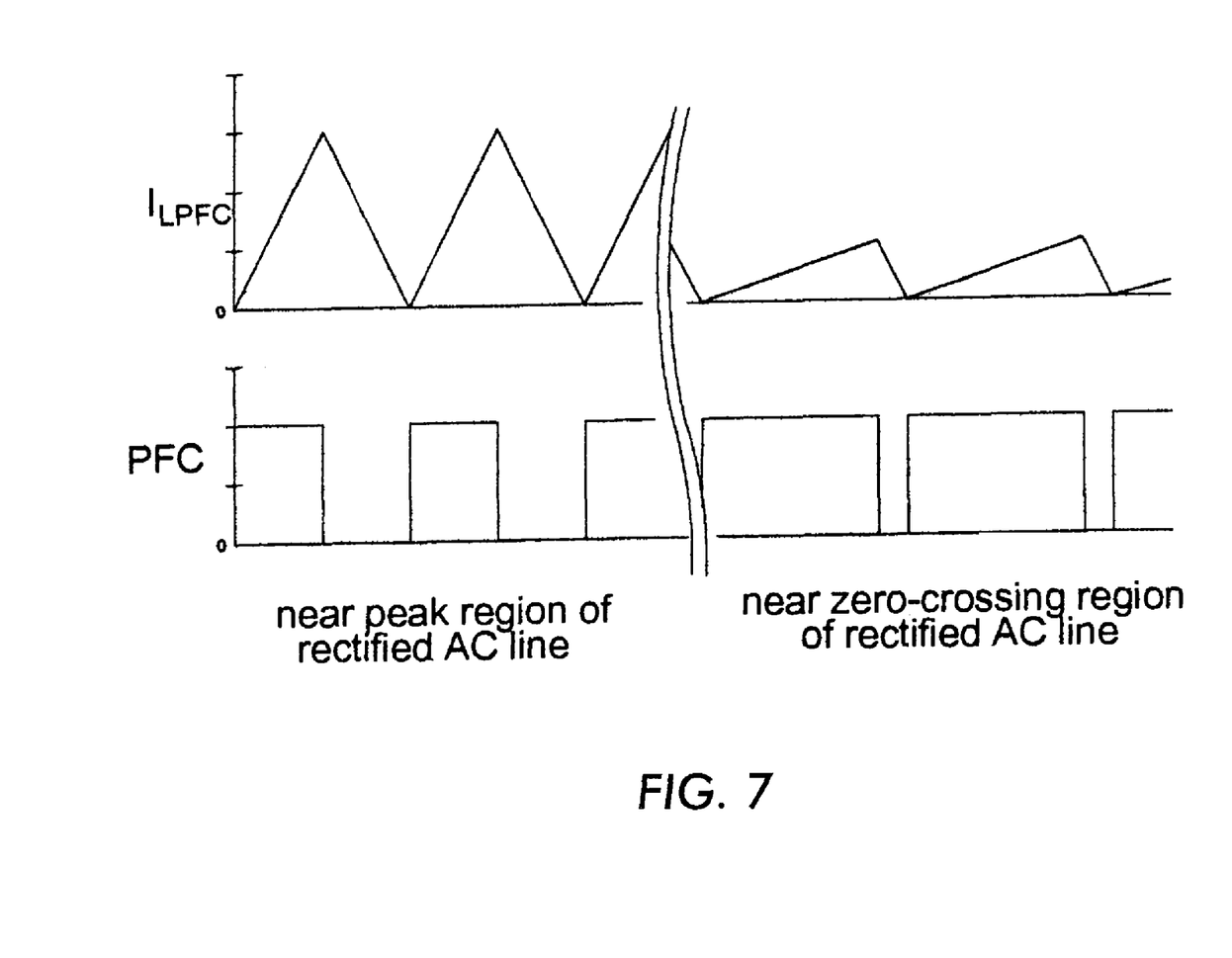
FIG. 7 is a graph showing On-Time modulation near zero-crossings achieved by the boost-type PFC control circuit of the present invention.

As illustrated in FIG. 7, a fixed On-Time of the switch $M_{PFC}$ over an entire cycle of the line input voltage produces a peak inductor current, which naturally follows the sinusoidal shape of the line input voltage. The smoothed averaged line input current is in phase with the line input voltage for high power factor but the THD, as well as the individual higher harmonics, of the current can still be too high. This is mostly due to crossover distortion of the line current near the zero-crossings of the line input voltage. To achieve low harmonics, which are acceptable to international standard organizations and general market requirements, an additional On-Time modulation circuit has been added to the PFC control.

FIG. 7 illustrates how this circuit dynamically increases the On-Time of the switch $M_{PFC}$ as the line input voltage nears the zero-crossings. This causes the peak current through the inductor $L_{PFC}$, and therefore the smoothed line input current, to increase slightly higher near the zero-crossings of the line input voltage. This reduces the amount of cross-over distortion in the line input current, which reduces the THD and higher harmonics to low levels.

Under/Over Voltage

Returning to FIG. 4, the controller circuit 20 further includes under- and over-voltage protection and over temperature protection. When under-voltage is detected, the circuit 20 enters an Under-Voltage Lock-Out mode (UVLO), which is defined as a state the circuit 20 is in when VCC is below a Turn-On threshold of the IC. The UVLO of the present invention is designed to maintain an ultra low supply current of less than 400 uA, and to guarantee the IC is fully functional before the PFC output is activated.

Should an over-voltage detection circuit sense an over-voltage condition on the DC bus causing VBUS pad 3 to exceed the internal 4.3V threshold ($V_{BUSOV}+$), the PFC output at PFC pad 6 is disabled, i.e., set to a logic "LOW". When the DC bus decreases again, causing VBUS pad 3 to decrease below the internal over-voltage negative threshold $V_{BUS}$, a watch-dog pulse is forced on PFC pad 6 and normal PFC operation is resumed.

Over Temperature Protection

Should an over-temperature detection circuit of the circuit 20 sense an over-temperature condition, a fault latch of a flip-flop RS3 is set, an oscillator is disabled, PFC pad 6 output goes "LOW", and the inventive circuit is put into the micropower mode. The fault latch can be reset by the under-voltage lockout signal from an over-temperature detection circuit, if $V_{CC}$ falls below the lower under-voltage threshold.

The following Equations may be used in calculating the PFC inductor value, peak current, and maximum On-Time. PFC inductor value:

$$L_{PFC} = \frac{(V_{BUS} - \sqrt{2} \cdot VAC_{MIN}) \cdot VAC_{MIN}^2 \cdot \eta}{2 \cdot f_{MIN} \cdot P_{OUT} \cdot V_{BUS}} \text{ [Henries]} \quad (1)$$

where,
$V_{BUS}$=DC bus voltage
$VAC_{MIN}$=Minimum rmis AC input voltage
$\eta$=PFC efficiency (typically 0.95)
$f_{MIN}$=Minimum PFC switching frequency at minimum AC input voltage
$P_{OUT}$=Ballast output power
Peak PFC inductor current:

$$i_{PK} = \frac{2 \cdot \sqrt{2} \cdot P_{OUT}}{VAC_{MIN} \cdot \eta} \text{ [Amps Peak]} \quad (2)$$

The PFC inductor must not saturate at $i_{pK}$ over the specified ballast operating temperature range. Proper core sizing and air-gapping should be considered in the inductor design.
Maximum On-Time:

$$t_{ON_{MAX}} = \frac{2 \cdot P_{OUT} \cdot L_{PFC}}{VAC_{MIN}^2 \cdot \eta} \text{ [Seconds]} \quad (3)$$

Figure 8:
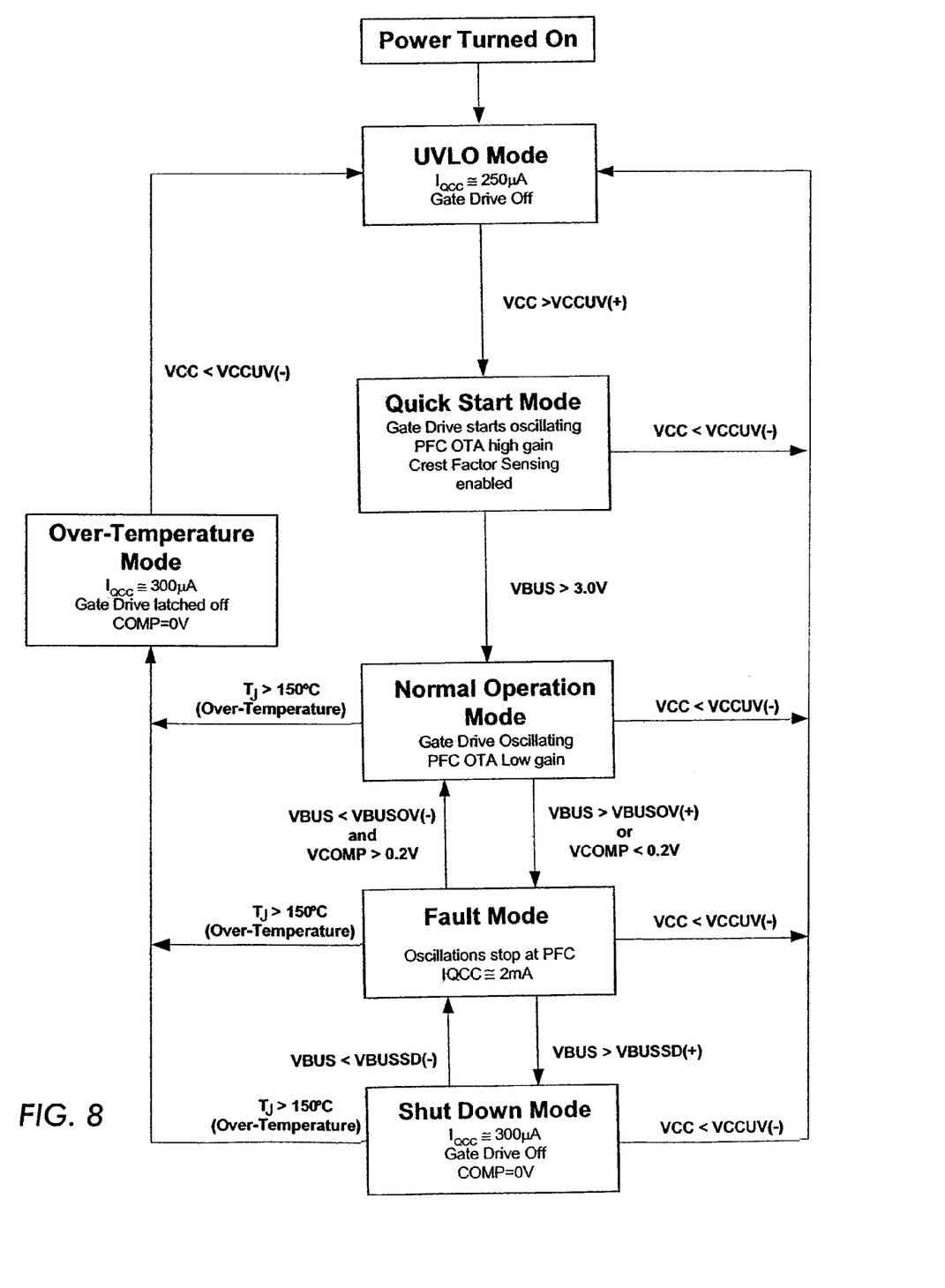
FIG. 8 is a state diagram showing mode succession in the PFC controller of the present invention.

FIG. 8 illustrates a state diagram of modes of the circuit 20. After the power is turned ON in initial mode S10, the circuit 20 enters into under voltage lockout (UVLO) mode S12. In this mode, quiescent $V_{CC}$ supply current $I_{QCC} \cong 250$ uA and power switch $M_{PFC}$ gate drive (FIG. 1) is OFF. If $V_{CC}$ is greater than $V_{CC}$ supply under-voltage positive going threshold $V_{CCUV}(+)$, then the circuit 20 enters a quick start mode S14.

In the quick start mode S14 the power switch $M_{PFC}$ gate drive starts oscillating, the OTA has a high gain, and crest factor sensing is enabled. If $V_{CC}$ supply under-voltage negative going threshold $V_{CCUV}(-) > V_{CC}$ the circuit 20 returns to the UVLO mode S12, otherwise, if the voltage at VBUS pad 3 $V_{BUS} > 3.0V$ the circuit 20 enters a normal operation mode S16.

In the normal operation mode S16 $M_{PFC}$ gate drive continues oscillating and the OTA has a low gain. If $V_{CC} < V_{CCUV}(-)$ the circuit 20 returns to the UVLO mode S12, otherwise, if over-voltage comparator threshold $V_{BUSOV}(+) < V_{BUS}$ or voltage at COMP pad 4 $V_{COMP} < 0.2V$ the circuit 20 enters a fault mode S18. Or if the circuit 20 senses an over-temperature condition or junction temperature Tj>150° C., it enters an over-temperature mode S22.

In the fault mode S18 $M_{PFC}$ gate drive stops oscillating and $I_{QCC} \cong 2$ mA. If $V_{BUS} < V_{BUSOV}(-)$ and $V_{COMP} > 0.2V$ the circuit 20 returns to the normal operation mode S16. If $V_{CC} < V_{CCUV}(-)$ the circuit 20 returns to the UVLO mode S12, otherwise, if $V_{BUS} > V_{BUSSD}(+)$ the circuit 20 enter a shutdown mode S20, or if the circuit 20 senses the over-temperature condition Tj>150° C., it enters the over-temperature mode S22.

In the shutdown mode S20 $I_{QCC} \cong 300$ uA, the $M_{PFC}$ gate drive is OFF, and COMP=0V. If $V_{CC} < V_{CCUV}(-)$ the circuit 20 returns to the UVLO mode S12, if $V_{BUS}$ shutdown comparator threshold $V_{BUSSD}(-) > V_{BUS}$ the circuit 20 returns to the fault mode S18, or if the circuit 20 senses the over-temperature condition Tj>150° C., it enters the over-temperature mode S22.

In the over-temperature mode S22 $I_{QCC} \cong 300$ uA, $M_{PFC}$ gate drive latch is OFF, and $V_{COMP}=0V$. In order to reset this Fault latch, the $V_{CC}$ supply to the circuit 20 must be cycled below the falling under-voltage lockout threshold $V_{CCUV}(-)$. When $V_{CC}<V_{CCUV}(-)$ the circuit 20 returns to the UVLO mode S12.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A power factor correction integrated circuit housed in an integrated circuit package for controlling a boost converter circuit having an input inductor coupled in series with a boost rectifier between a rectified AC line input voltage and a DC bus voltage, on a DC bus, the rectified AC line input voltage provided by a rectifier coupled to an AC line input voltage to be power factor corrected, the integrated circuit comprising:
a first input circuit sensing the DC bus voltage, said first input circuit integrated into said integrated circuit;
a second input circuit sensing current through the inductor and determining when the current through the inductor discharges to substantially zero current,
a power switch coupled between a common connection of the inductor and boost rectifier and a return line of said DC bus for allowing said inductor to be charged by current from said rectified AC line input voltage when said power switch is turned on;
an over-current sensing circuit for detecting an over-current condition without an external current sense resistor; and
a control circuit comprising a feedback circuit comparing said DC bus voltage to a fixed reference voltage for turning OFF said power switch for a period of time to maintain said DC bus voltage at a desired level;
the feedback circuit comprising an operational transconductance amplifier which sinks or sources a current to an external capacitor coupled to a PFC Error Amplifier;
said control circuit further operating so that when said inductor current is substantially zero, said power switch is turned ON forcing current through said inductor and charge said inductor, thereby forcing the current in said inductor to follow said rectified AC line input voltage and achieve power factor correction of said AC line input voltage;
said power switch being contained within said integrated circuit package.

2. The circuit of claim 1, wherein said integrated circuit package has no more than six pins.

3. The circuit of claim 2, wherein said six pins include a power switch main electrode, a common, a control circuit supply voltage, an inductor current sense and a DC bus voltage sense.

4. A power factor correction control integrated circuit for controlling a boost converter circuit having an input inductor coupled in series with a boost rectifier between a rectified AC line input voltage and a DC bus voltage on a DC bus, the rectified AC line input voltage provided by a rectifier coupled to an AC line input voltage to be power factor corrected, and a power switch coupled between a common connection of the inductor and boost rectifier and return line of said DC bus for allowing said inductor to be charged by current from said rectified AC line input voltage when said power switch is turned on, the control integrated circuit comprising:
a first input circuit sensing the DC bus voltage, said first input circuit integrated into said integrated circuit;
a second input circuit sensing current through the inductor and determining when the current through the inductor discharges to substantially zero current;
an over-current sensing circuit for detecting an over-current condition without an external current sense resistor; and
a control circuit having inputs coupled to outputs from said first and second input circuits to control the On-Time of the power switch to regulate the DC bus voltage to a desired voltage level and to achieve power factor correction of said AC line input voltage, the On-Time of the power switch is increased to increase the voltage on the DC bus and is decreased to decrease the voltage on the DC bus;
the control circuit comprising a feedback circuit comparing said DC bus voltage to a fixed reference voltage for turning OFF said power switch for a period of time to maintain said DC bus voltage at a desired level;
the feedback circuit comprising an operational transconductance amplifier which sinks or sources a current to an external capacitor coupled to a PFC Error Amplifier;
said control circuit further operating so that when said inductor current is substantially zero, said power switch is turned ON forcing current to open through said inductor and charge said inductor, thereby forcing the current in said inductor to follow said rectified AC line input voltage and achieve power factor correction of said AC line input voltage.

5. The circuit of claim 4, wherein the boost converter circuit includes at most six resistors.

6. The circuit of claim 4, wherein a resulting voltage of the PFC Error Amplifier sets a threshold for charging of an internal timing capacitor which programs a time of a "HIGH" state at an output of a gate drive of the power switch;
the feedback circuit operating with a slow speed and a low gain such that an average inductor current smoothly follows a low-frequency AC line input voltage for a high power factor and a low Total Harmonic Distortion (THD).

7. The circuit of claim 4, wherein the circuit requires only four control pins including
a PFC error amplifier compensation pin for programming the On-Time of the power switch and speed of a feedback circuit;
a power switch main electrode pin for monitoring the current flowing through the power switch;
an inductor current sense pin for detecting when the current is flowing in the inductor discharges to zero via a secondary winding of the inductor; and
a DC bus voltage sense pin for sensing voltage via an external resistor voltage divider, voltage at the DC bus voltage sense pin being regulated against a fixed internal voltage reference.

8. The circuit of claim 6, wherein the second input circuit comprising a resistor coupling a secondary winding of the inductor to the inductor current sense pin detects discharge of the inductor current to a level of zero and programs a time of a "LOW" state at the output of a gate drive of the power switch.

9. The circuit of claim 8, wherein a positive-going edge of an inductor current exceeding an internal 2V threshold signals a beginning of the OFF-Time, and a negative-going edge of the inductor current sinusoidal falling below 1.7V occurring when the inductor current discharges to zero, signals the end of the OFF-Time.

10. The circuit of claim 4, wherein the over-current sensing circuit is configured to detect an over-current condition without an external current sense resistor by using the on-resistance (RDSon) of the power switch, wherein voltage at a drain of the power switch provided to the first input circuit is determined by the current flowing through it and its RDSon, wherein voltage at the drain of the power switch provided to the first input circuit is measured during the ON-time of the power switch.

11. The circuit of claim 10, wherein the over-current sensing circuit includes a comparator and an internal high voltage transmission gate switch connected as a transmission gate, the transmission gate switch applies a voltage level sensed at the drain of the power switch to one input of the comparator, the transmission gate switch protecting the comparator from HIGH level voltage of about 600V during the Off-Time of the power switch.

12. The circuit of claim 11, wherein:
the transmission gate switch is ON when the output of the gate drive of the power switch is "HIGH" and the voltage level sensed at the drain of the power switch is compared to a threshold; and
when the voltage level sensed at the drain of the power switch while the transmission gate switch is ON reach a value greater than the threshold, an over-current condition is signaled and the output of the gate drive of the power switch is set "LOW".

13. The circuit of claim 11, wherein the over-current sensing circuit works on a cycle by cycle basis and further comprises a blanking circuit to filter leading edge current spikes that can occur during the initial turn ON of the power switch to limit a maximum current through the power switch.

14. The circuit of claim 13, further comprising an over-temperature sensing circuit for detecting an over-temperature condition from a positive temperature coefficient of the RDS (on), when the over-temperature condition is detected the gate drive of the power switch is disabled thereby setting the output of the gate drive of the power switch "LOW".

15. The circuit of claim 14, further comprising an over-voltage circuit for detecting an over-voltage condition of a voltage on the DC bus voltage sensing pin exceeding an internal threshold, when the over-voltage condition is detected the output of the gate drive of the power switch "LOW".

16. The circuit of claim 15, wherein when the voltage on the DC bus voltage sense pin decreases below the internal threshold the watch-dog timer sends a pulse that forces the output of the gate drive of the power switch "HIGH" for an On-Time duration programmed by the control circuit.

17. The circuit of claim 4, wherein:
when the AC line input voltage is near the zero crossing, the inductor current will charge up to a small amount and the discharge time will be fast resulting in a high switching frequency; and
when the AC line input voltage is near a peak, the inductor current will charge up to a higher amount and the discharge time will be longer resulting in a lower switching frequency.

18. A method of controlling power factor correction of a boost converter circuit having an input inductor coupled in series with a boost rectifier between a rectified AC line input voltage and a DC bus voltage on a DC bus, a power switch coupled between a common connection of the inductor and boost rectifier and a return line of the DC bus for allowing the inductor to be charged by current from the rectified AC line input voltage when the power switch is turned on, an over-current sensing circuit for detecting an over-current condition without an external current sense resistor, and a control integrated circuit comprising a first input sensing the DC bus voltage, a second input sensing current through the inductor and determining when the current through the inductor discharges to substantially zero current, and a control circuit having inputs coupled to outputs from said first and second input circuits to control the On-Time of the power switch to regulate the DC bus voltage to a desired voltage level and to achieve power factor correction of said AC line input voltage, the On-Time of the power switch is increased to increase the voltage on the DC bus and is decreased to decrease the voltage on the DC bus, the method comprising the steps of:
(a) setting the quiescent supply voltage current to about 250 uA and a gate drive of the power switch "LOW", continuously monitoring the supply voltage and proceeding to the quick start step (b) if the supply voltage is greater than a supply under-voltage positive going threshold;
(b) starting oscillation of the gate drive of the power switch, an operational transconductance amplifier (OTA) providing a high gain, wherein the OTA sinks or sources a current to an external capacitor coupled to a PFC Error Amplifier, and enabling crest factor sensing, and proceeding to a normal operation mode at step (c) if the internal reference voltage is greater than 3.0V;
(c) continuously oscillating the gate drive of the power switch, the OTA providing a low gain, and proceeding to the fault mode step (d) if the internal reference voltage is greater than the over-voltage comparator threshold or error amplifier output voltage is less than 0.2V;
(d) stopping the oscillation of the gate drive of the power switch, setting quiescent supply voltage current to about 2 mA, returning to the normal operating step (b) if the internal reference voltage is less than the over-voltage comparator threshold and error amplifier output voltage is greater than 0.2V or proceeding to the shutdown mode step (e) if the internal reference voltage is greater than shutdown comparator threshold; and
(e) setting quiescent supply voltage to about 300 uA and error amplifier output voltage to 0V, stopping the oscillation of the gate drive of the power switch, and returning to the fault mode step (d) if the internal reference voltage is greater than shutdown comparator threshold.

19. The method of claim 18, further comprising a prerequisite step of turning ON power.

20. The method of claim 18, further comprising an over-temperature step (f):
setting quiescent supply voltage current to about 300 uA and error amplifier output voltage to 0V and stopping the oscillation of the gate drive of the power switch, wherein if a junction temperature is greater than 150° C. while the control integrated circuit is performing the steps (c), (d), and (e), the processing proceeds to step (f).

21. The method of claim 20, wherein if the voltage supply of the control integrated circuit is less than voltage supply under-voltage negative going threshold while the control integrated circuit is performing the steps (b), (c), (d), (e) and (f), the processing proceeds to the under-voltage lockout step (b).

* * * * *